United States Patent [19]

Kawashita

[11] Patent Number: 4,874,278
[45] Date of Patent: Oct. 17, 1989

[54] WOOD SCREW WITH CHIP REMOVING PORTION

[75] Inventor: Fukunosuke Kawashita, Kawachinagano, Japan

[73] Assignee: Kabushiki Kaisha Yamahiro, Osaka, Japan

[21] Appl. No.: 90,917

[22] Filed: Aug. 31, 1987

[30] Foreign Application Priority Data

Feb. 16, 1987 [JP] Japan .................................. 62-20901

[51] Int. Cl.⁴ ............................................. F16B 25/02
[52] U.S. Cl. .................................... 411/386; 408/226; 411/387; 411/412
[58] Field of Search ............... 411/412, 413, 399, 386, 411/387; 408/226, 214, 230

[56] References Cited

U.S. PATENT DOCUMENTS

| | | | |
|---|---|---|---|
| 408,531 | 8/1889 | Rogers | 411/412 |
| 410,697 | 9/1889 | Rogers | 411/412 |
| 684,774 | 10/1901 | Baggs | 411/386 |
| 1,084,643 | 1/1914 | Lasater | 411/399 |
| 2,263,137 | 11/1941 | Oestereicher | 411/413 |
| 3,665,801 | 5/1972 | Gutshall | 411/387 |
| 3,699,841 | 10/1972 | Lanius, Jr. | 411/387 |
| 3,739,682 | 6/1973 | Siebol et al. | 411/387 |
| 3,827,331 | 8/1974 | Muenchinger | 411/387 |
| 4,241,638 | 12/1980 | Shimizu et al. | 411/412 |
| 4,655,661 | 4/1987 | Brandt | 411/412 X |

FOREIGN PATENT DOCUMENTS

| | | | |
|---|---|---|---|
| 78515 | 4/1917 | Austria | 411/386 |
| 1960453 | 6/1970 | Fed. Rep. of Germany | 411/399 |
| 15102 | of 1906 | United Kingdom | 411/399 |
| 251409 | 5/1926 | United Kingdom | 411/412 |

*Primary Examiner*—Lloyd A. Gall
*Attorney, Agent, or Firm*—Birch, Stewart, Kolasch & Birch

[57] ABSTRACT

Wood screw comprising a head for receiving a fastening tool and a shank extending from the head. The shank is provided at the tip thereof with a tip guide portion adapted to penetrate an article to be fastened while boring a hole into the article such as timber. The shank is provided at the head side thereof with a fastening screw portion having at least a single screw thread. A chips removing screw portion is disposed between the tip guide portion and the fastening screw portion. The chips removing screw portion has screw threads, the number of which is greater than that of the fastening screw portion. The screw thread lead angle of the chips removing screw portion is larger than that of the fastening screw portion.

4 Claims, 5 Drawing Sheets

F I G. 2
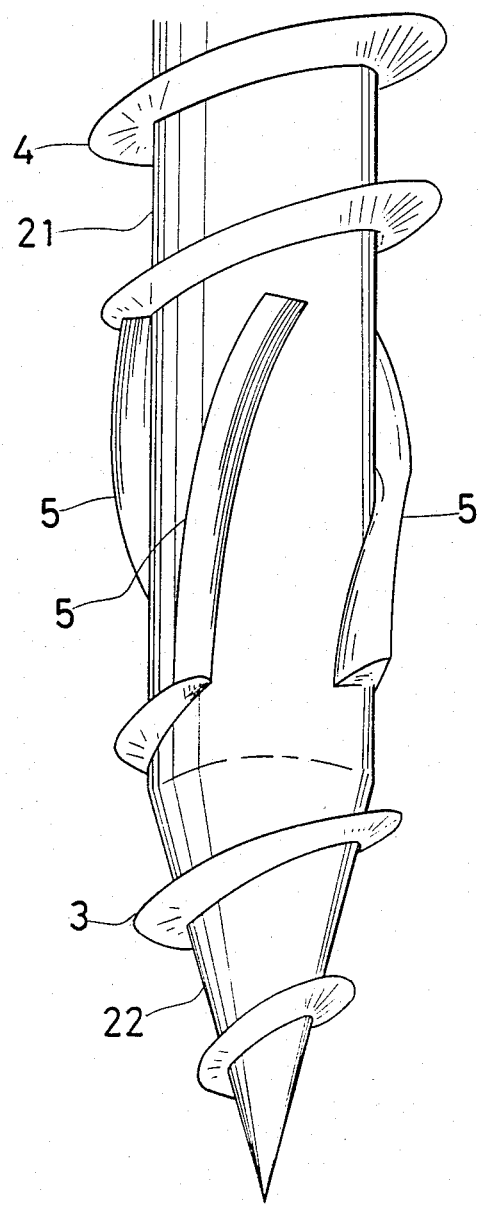

WOOD SCREW WITH CHIP REMOVING PORTION

BACKGROUND OF THE INVENTION

The present invention relates to improvements in wood screws.

As shown in FIG. 3, a conventional wood screw has a head (a) for receiving a fastening tool, a shank (b) extending from the head and including a parallel shank portion (b1) and a tapering tip (b2) formed at the tip of the parallel shank portion (b1), and a screw thread (c) formed on the tapering tip (b2) and the parallel shank portion (b1).

A screw of the so-called self-drilling type provided at the tip thereof with drilling blades (b3) as shown in FIG. 4, can also be used as a wood screw.

A wood screw may be screwed directly into an article to be fastened such as timber without boring a hole before driving. Such a mode of use presents the disadvantages that the turning torque required for fastening becomes great and the article to be fastened such as timber may be cracked.

From the study the inventor has made of such problems, it has become apparent that such problems were caused by defective discharge of chips produced at a time when a hole was bored by the tapering tip or the drilling portion. In particular, it has been found that such chips stuck to the surfaces of the screw thread and the shank near the shank tip, and in particular, in the vicinity of the tip of the parallel shank portion. In other words, chips stuck at that portion of the shank which is located slightly at the base side with respect to the tapering tip or the drilling portion. Such sticking of chips is caused by the fact that, during fastening, chips enter and are compressed between the wall of a hole bored by the tapering tip or the drilling portion and the tip end of the parallel shank portion.

BRIEF SUMMARY OF THE INVENTION

The present invention has the object of overcoming the above-mentioned inconveniences by providing a wood screw which comprises:

a head for receiving a fastening tool;

a shank extending from the head, the shank provided at the tip thereof with a tip guide portion adapted to be penetrated, while boring a hole, into an article to be fastened such as timber, the shank being provided as the base side thereof with a fastening screw portion having at least a single screw thread; and a chips removing screw portion disposed between the tip guide portion and the fastening screw portion, this chips removing screw portion having screw threads the number of which is greater than that of the fastening screw portion;

the screw thread lead angle of the chips removing screw portion being larger than that of the fastening screw portion.

The tip guide portion may be made with a screw thread formed on the tapering tip or with drilling blades formed on the tapering tip, as far as the tip guide portion can be penetrated, while boring a hole, into an article to be fastened.

In accordance with the present invention, the shank is provided at the tip side thereof with chips removing screw threads having a lead angle larger than that of other screw threads. Therefore, chips produced at a time when a hole is bored, are conveyed and spread from these screw threads toward the base side of the shank. This prevents the blocking by such chips to enable the screw to be driven with the low torque.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is an enlarged perspective view of main portions of the wood screw in FIG. 1, viewed from the back tip thereof;

DETAILED DESCRIPTION OF THE PREFERRED EMBODIMENT

The following description will discuss an embodiment of the present invention with reference to the accompanying drawings.

Figure 1:
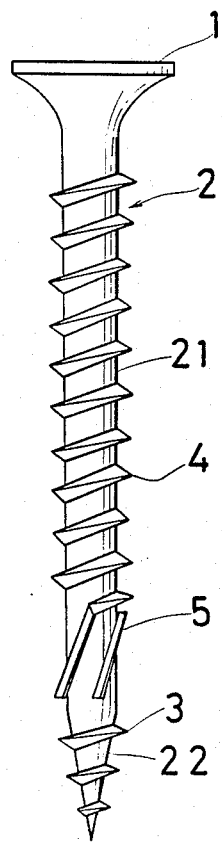
FIG. 1 is a front view of a wood screw in accordance with one embodiment of the present invention.
Figure 3:
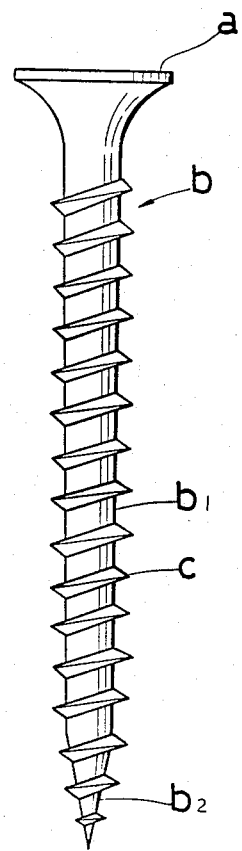
FIG. 3 is a front view of a conventional wood screw.
Figure 4:
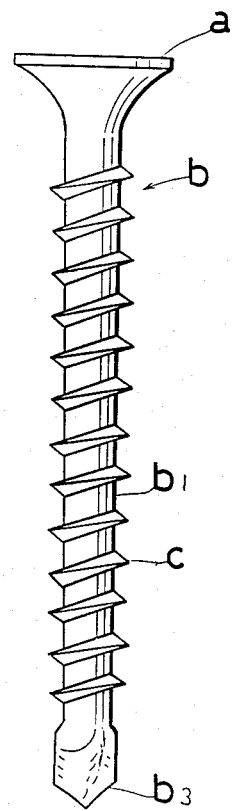
FIG. 4 is a front view of a conventional self-drilling screw.

FIG. 1 is a front view of a wood screw in accordance with one embodiment of the present invention, while FIG. 2 is a perspective view of the wood screw in FIG. 1, viewed from the back tip thereof.

In FIGS. 1 and 2, the wood screw has a head (1) for receiving a fastening tool, and a shank (2) extending from the head. The shank (2) includes a parallel shank portion (21) having a substantially constant diameter, and a tapering tip (22) at the tip of the parallel shank portion (21).

The shank is provided at the tip thereof with a single screw thread (3). This screw thread (3) extends from the tapering tip (22) and reaches the parallel shank portion (21), after which the screw thread (3) goes about half way around. The tapering tip (22) having this screw thread (3) constitutes a tip guide portion adapted to be penetrated, while boring a hole, into an article to be fastened.

The shank is provided at the base side with a single screw thread (4) which fulfills a fastening function. In this embodiment, the screw thread (4) has the same lead angle and the same outer diameter as a maximum outer diameter of the tip screw thread (3) if the screw thread (3) were to encircle the parallel shank portion (2). This is because the screw thread (4) is located on an extension line of the helix of the screw thread (3). Such conditions of the screw threads (3) and (4) are illustrated in this embodiment by way of example only, and are not necessarily required.

Between both screw portions, screw threads (5) for removing chips are formed on that portion of the shank which is located in the vicinity of the shank tip. Four screw threads (5) are formed and these screw threads (5) have a lead angle of 70° which is larger than that of the screw threads (3) and (4).

In this embodiment, the base end of the tip screw thread (3) is connected to the tip of one of the chips removing screw threads (5) (FIG. 2), while the tip of the fastening screw thread (4) is connected to the base end of another one of the chips removing screw threads (5) (FIG. 1). However, such arrangement is not necessarily required, and spaces may be provided between the screw threads (3) and (5), and between the screw threads (4) and (5). In such a case, modifications may be made in the embodiment illustrated. For example, the heights of the screw threads (3) and (4) may be gradually decreased up to zero such that the screw threads (3) and (4) would be flush at one end with either the parallel shank portion (21) and/or the tapering tip (22). When the base end of the tip screw thread (3) is connected to the tip of one of the chips removing screw threads (5), it is desired to gradually decrease the height of the tip screw thread (3) at the base end thereof to such an extent that the tip screw thread (3) is smoothly connected to the tip of one of the chips removing screw threads (5).

In this embodiment, each of the chips removing screw threads (5) goes around about ¼ time, but the circumferential distance of each chips removing screw thread varies with the size of the lead angle and the length of this screw portion. The screw threads (5) have an outer diameter smaller than that of the maximum outer diameter of the screw threads (3) and (4). In order to prevent the fastening force of the fastening screw thread (4) from being decreased, it is desired to reduce the outer diameter of the screw threads (5). However, such screw threads are designed according to the type, size and the like of an article to be fastened. Alternatively, the outer diameter of the fastening screw thread (4) may be gradually changed. For example, the outer diameter of the fastening screw thread (4) may be greater, at the base side (the side of head 1) than that of the chips removing screw threads (5), and the outer diameter of the screw thread (4) may be smaller, at the tip side, than the outer diameter of the chips removing screw threads (5).

In this embodiment, the chips removing screw threads (5) have a constant height, but such height may be varied. For example, the height may be zero at the tip side such that the chips removing screw threads (5) are flush with the parallel shank portion (21) and may be gradually increased in a direction toward the base side. In this embodiment, the parallel shank portion (21) has a constant root diameter, but such root diameter can also be changed. In particular, smaller root diameters of the chip removing screw threads (5) are effective to prevent blocking by chips.

Alternatively, tthe chips removing screw threads (5) may be extended up to the tip end of the parallel shank portion (21), or up to the base portion of the tapering tip (22).

Figure 5:
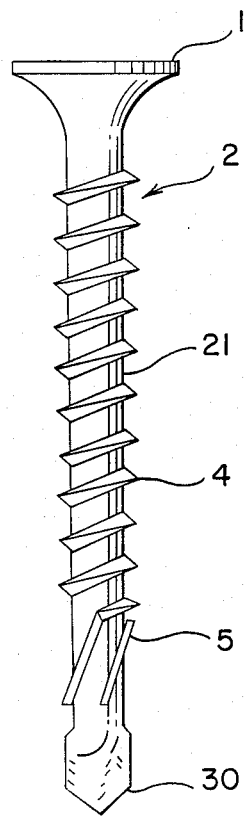
FIG. 5 is a front view of a wood screw in accordance with a second embodiment of the present invention.

The tip guide portion may be alternatively embodied so as to have drilling blades (30) as shown in FIG. 5.

The following shows the results of performance tests conducted on, as one part, the wood screw in accordance with the present invention illustrated and described hereinbefore (hereinafter referred to as "I Screw") and, as the other part, the conventional wood screw (hereinafter referred to as "II Screw") and the self-drilling screw (hereinafter referred to as "III Screw") as comparative examples.

(1) Test Date: Jan. 8, 1987
(2) Test Place: Yamahiro Company Limited, Head Office Test Room
(3) Screw Tested:

|  | Outer diameter of screw thread × Whole Length |
|---|---|
| I Screw | 4.0 × 35 mm |
| II Screw | 3.8 × 32 mm |
| III Screw | 4.2 × 35 mm |

(4) Test Items
4.1 External Sizes
4.2 Driving torque test with the use of a manual torque screwdriver
4.3 Driving time test with the use of an electric screwdriver
(5) Test Methods
5.1 In the driving torque test, a Kanon idle-type torque screwdriver 20 LTDK was used.
5.2 In the driving time test, the screws were driven up to 22 mm from the screw tips into an article with the use of a Nakita screwdriver of 2500 RPM with a load of 13.5 kgs.
(6) Test Results

| 6.1 External Sizes in mm | | | | | | |
|---|---|---|---|---|---|---|
|  | A | B | C | D | E | F |
| I Screw | 4.0 | 2.6 | 12° | 26° | — | — |
| II Screw | 3.8 | 2.4 | 12° | 26° | — | — |
| III Screw | 4.2 | 2.6 | 12° | 110° | 5.0 | 3.1 |
|  | G | H | I | J | | |
| I Screw | 5.0 | 5.1 | 3.6 | 70° | | |
| II Screw | 5.0 | — | — | — | | |
| III Screw | — | — | — | — | | |

A: Screw outer diameter
B: Shank root diameter
C: Lead angle
D: Tip angle
E: Length of the drilling protion (b3)
F: Outer diameter of the cutting blades of the drilling portion (b3)
G: Length of the tapering tip
H: Length of the chips removing screw threads
I: Outer diameter of the chips removing screw threads
J: Lead angle of the chips removing screw threads 6.2 Threading Torque Test and Time Test

| Japanese cypress | Driving Torque | Time |
|---|---|---|
| I Screw | 7.7 kgf/cm | 0.45 second |
| II Screw | 11.4 kgf/cm | 0.25 second |
| III Screw | 9.8 kgf/cm | 1.24 second |

Average data of 5 screws which were driven.

As apparent from (6) Test Results, it is found that, in Driving Torque Test, the wood screw in accordance with the present invention (I Screw) was driven into timber with the smallest torque as compared with the comparative screws (II Screw and III Screw). Also, as apparent from Driving Time Test, it is found that the driving time of the wood screw in accordance with the present invention (I Screw) was reduced to about ⅓ of the driving time required for the self-drilling screw (III Screw) as a comparative example. The wood screw of the present invention (I Screw) is inferior to the comparator wood screw (II Screw) in driving time by 0.2 second only, which is too small to be judged significantly different from II Screw.

In accordance with the present invention, a plurality of chips removing screw threads having a lead angle larger than that of the screw thread of a fastening screw portion are formed on that portion of a shank which is near to the shank tip, so that chips produced at a time when a hole is bored, are conveyed and spread toward the side of the shank attached to head (1) by these screw threads. Therefore, blocking by chips can be prevented, thus achieving screw driving with small torque and preventing an article to be fastened from being cracked at the time of screw driving.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wood screw comprising:
   a head for receiving a fastening tool;
   a shank extending from said head, said shank having a fastening screw portion extending over a first portion thereof, said fastening screw portion having at least one screw thread;
   a chips removing screw portion adjacent said fastening screw portion, said chips removing screw portion extending over a second portion of said shank, said shank in said first and second portions having generally the same diameter, said chips removing portion having more screw threads than said first portion of the shank, one of said screw threads of said chips removing screw portion being in engagement with said at least one screw thread of said first portion of the shank, another one of said screw threads of said chips removing screw portion being free of said at least one screw thread, the screw threads of said chips removing screw portion having a larger lead angle than the at least one screw thread of said first portion of the shank; and
   a tip portion adjacent said chips removing screw portion such that said chips removing screw portion is between said first portion of the shank and said tip portion, said tip portion having at least one screw thread form thereon and being adapted to penetrate an article, said screw thread of the tip portion adjacent the chips removing screw portion having an outer diameter which is generally the same as an outer diameter of the at least one screw thread of the first portion of the shank, said at least one screw thread of said first portion of the shank being located on a helical extension line of said screw thread of said tip portion;
   said chips removing screw portion conveying and spreading chips formed by said article toward said first portion of the shank upon penetration of said article by said tip portion and upon formation of a hole in said article.

2. The wood screw as set forth in claim 1, wherein the screw threads of the chips removing screw portion have an outer diameter which is smaller than an outer diameter of the at least one screw thread of the first portion of the shank.

3. The wood screw as set forth in claim 1, wherein the number of screw threads of the chips removing screw portion is four.

4. The wood screw as set forth in claim 2, wherein the number of screw threads of the chips removing screw portion is four.

* * * * *